United States Patent [19]
Mullersman

[11] 3,736,489
[45] May 29, 1973

[54] TEMPERATURE SENSING SYSTEM FOR RECHARGEABLE BATTERIES

[75] Inventor: Ferdinand H. Mullersman, Gainesville, Fla.

[73] Assignee: General Electric Co., Owensboro, Ky.

[22] Filed: May 21, 1971

[21] Appl. No.: 145,724

[52] U.S. Cl..................................320/35, 320/39
[51] Int. Cl..............................................H02j 7/10
[58] Field of Search......................320/31, 35, 39, 40

[56] References Cited
UNITED STATES PATENTS

| | | | |
|---|---|---|---|
| 3,531,706 | 9/1970 | Mullersman | 320/39 X |
| 3,421,068 | 1/1969 | Van Marter | 320/35 X |
| 3,462,356 | 8/1969 | Wallinder | 320/31 X |
| 3,599,071 | 8/1971 | Lapuyade et al. | 320/31 X |
| 3,614,584 | 10/1971 | Burkett et al. | 320/35 |
| 3,274,447 | 9/1966 | Boyes | 320/35 |

Primary Examiner—J. D. Miller
Assistant Examiner—Robert J. Hickey
Attorney—Nathan J. Cornfeld, John P. Taylor, Frank L. Neuhauser, Oscar B. Waddell and Joseph B. Forman

[57] ABSTRACT

An improved temperature sensing system for rechargeable batteries is provided which utilizes the voltage developed across one or a group of series connected diodes such as, for example, silicon diodes, at a preselected constant current to indicate the temperature of the battery and to accordingly adjust the level of battery voltage at which charge control action should be accomplished.

When constant current charging is used, the proportionality between the voltage across the diodes and the desired voltage at which a high charge rate is modified can be made constant over a large temperature range by selecting the proper level of constant current to be passed through the diodes.

6 Claims, 5 Drawing Figures

Patented May 29, 1973

INVENTOR
FERDINAND H. MULLERSMAN

John P. Taylor

ATTORNEY

Patented May 29, 1973 3,736,489

INVENTOR
FERDINAND H. MULLERSMAN

John P. Taylor
ATTORNEY

INVENTOR
FERDINAND H. MULLERSMAN

John P. Taylor
ATTORNEY

3,736,489

TEMPERATURE SENSING SYSTEM FOR RECHARGEABLE BATTERIES

BACKGROUND OF THE INVENTION

This invention relates to rechargeable batteries. More particularly this invention relates to an improved temperature sensing system for charging rechargeable batteries.

Rechargeable batteries are desirably charged at a relatively high rate to a predetermined state of charge which, although not necessarily indicative of the full charge state, signifies a charge level beyond which charging at a high rate may have deleterious results. For example, in a nickel-cadmium rechargeable battery, charging at a high charge rate beyond a certain level may result in gassing within the cells which can cause undesirable loss of water from the electrolyte as well as damage to the separators between the plates within the cells.

When charged under constant current conditions, many types of batteries such as, for example, nickel cadmium, exhibit a voltage rise as the cell approaches the full charge state. This voltage rise can be monitored by an appropriate detection circuit to cut off or modify the high charge rate when the voltage rise occurs.

One difficulty with using voltage rise as a monitor of the state of charge at which the high charging rate should be cut off or reduced involves the temperature of the battery. The particular voltage level (which can be referred to as the cut off voltage level) which indicates some predetermined level of charge within the battery will vary with the temperature of the battery. For example, in a nickel-cadmium battery having 10 cells a cut off voltage of 14.8 volts at 25° centigrade indicates a charge level beyond which charging at high rates is undesirable. If, however, the temperature of the battery should drop to, for example, 20° Centigrade, the cut off voltage representing the same level of charge within the battery will be higher. Thus charges which monitor the voltage of a battery to determine the charge level of the battery should have temperature sensing means which take into account the temperature of the battery as well.

Various temperature sensing means have been used for this purpose such as, for example, thermistors, resistors, as well as multijunction semiconductors such as transistors and silicon-controlled rectifiers. Some sensors do not exhibit linearity over a large temperature range. Other sensors exhibit positive temperature coefficients, rather than negative, requiring additional circuitry to invert the temperature coefficient. Active devices such as transistors and silicon-controlled rectifiers can function as temperature sensitive switches. These devices have been utilized by placing the device in thermal proximity to the battery whereby the temperature of the battery alters the switching characteristics of the device. These active devices, however, suffer from a certain degree of unpredictability in that the temperature sensitive characteristics of each device do not necessarily match those of other devices in the same class or type making additional selection or screening necessary.

It is therefore an object of this invention to provide an improved temperature sensing system comprising a sensor which will exhibit, in response to an impressed constant current, a voltage proportional to the preselected charge cut off voltage of the battery at a given temperature and which will also exhibit a substantially linear temperature coefficient of voltage approximately matching the temperature coefficient of voltage of the battery over a wide range of temperature so, that the voltages remain in a constant proportion substantially independent of temperature over the desired operating range.

It is another object of the invention to provide a charge control system wherein battery voltage sensing means and battery sensing means act to provide a control signal to modify a high charge rate a predetermined level of charge substantially independent of temperature.

These and other objects of the invention will become apparent from the description and drawings.

DESCRIPTION OF THE PREFERRED EMBODIMENT

Figure 1:
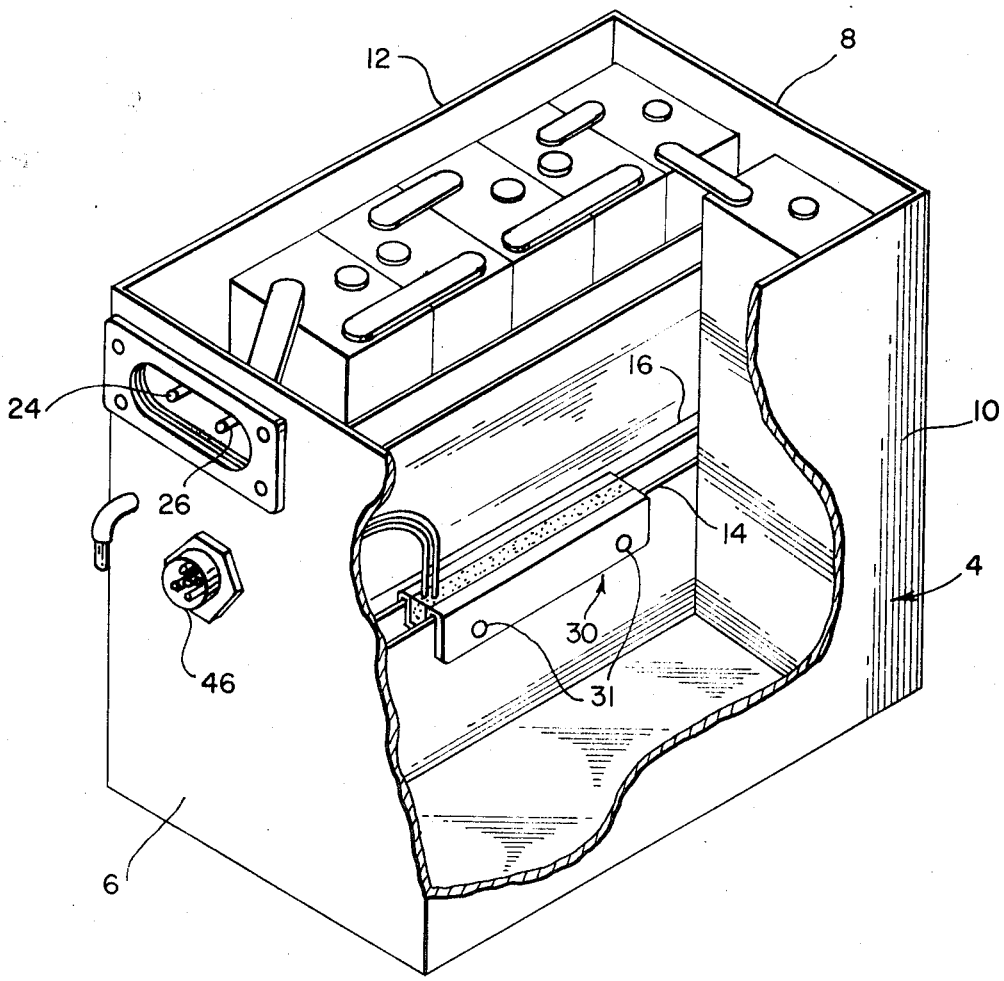
FIG. 1 is a partially cut away isometric view of a preferred embodiment of the invention.
Figure 2:
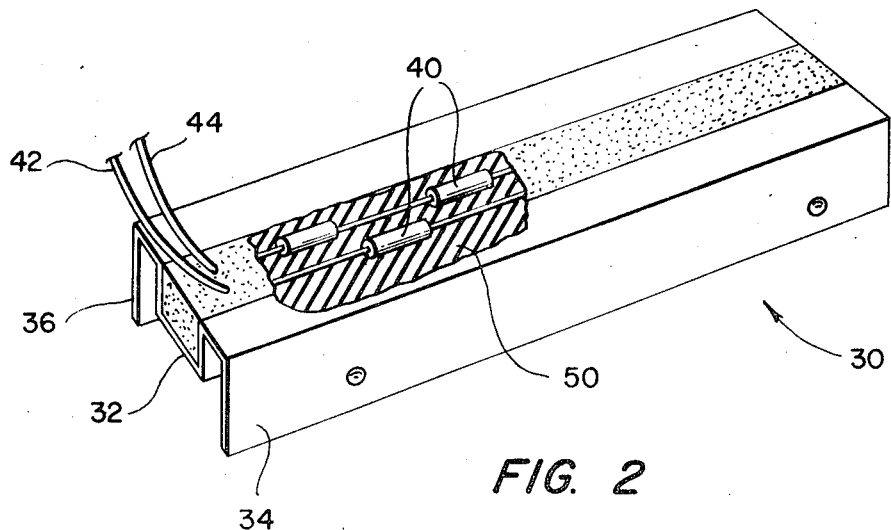
FIG. 2 is an enlarged, partially cut away view of a portion of FIG. 1.
Figure 3:
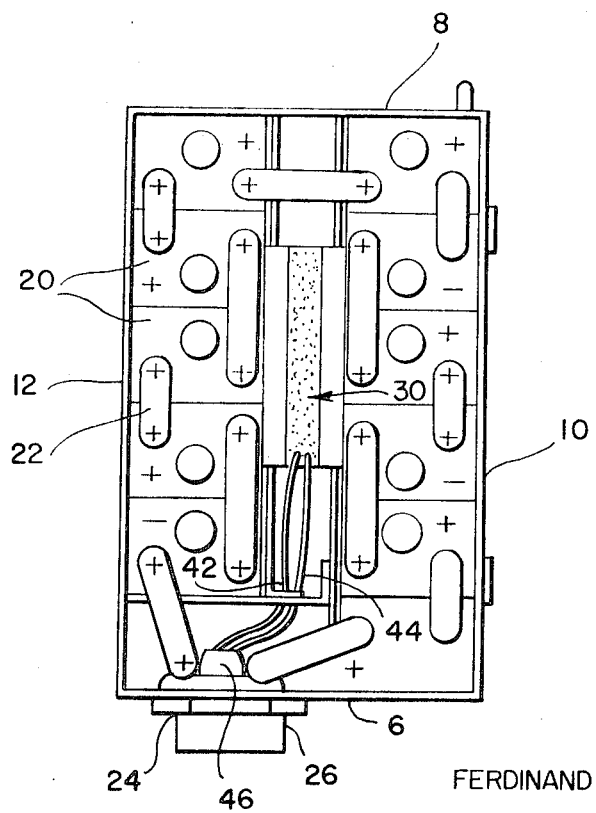
FIG. 3 is a top view of FIG. 1.

Turning now to FIGS. 1, 2 and 3 a battery is generally indicated at 2 comprising a casing 4 having a front wall 6, rear wall 8 and sidewalls 10 and 12. A pair of parallel reinforcing walls 14 and 16 are each connected to front walls 6 and rear wall 8 to divide casing 4 into two compartments. Reinforcing walls 14 and 16 do not extend the full height of walls 6 and 8; preferably extending only about one-third of the height of wall 6.

As best shown in FIGS. 1 and 3, a number of cells 20 are vertically arranged side by side in the two compartments formed by casing 4 and reinforcing walls 14 and 16. Cells 20 are series connected together by straps 22 to form a battery whose voltage is made available externally via terminals 24 and 26.

A temperature sensing member 30 is provided comprising a channel shaped member constructed of a heat-conductive metal such as nickel. Sensing member 30 has an inner central trough 32 and downwardly depending fin members 34 and 36. Fin members 34 and 36 respectively fit over walls 14 and 16 so that the fin members are in direct contact with the walls of a plurality of cells 20 to provide a direct thermal path from cells 20 to temperature sensor 30. It should be noted here that the height of sensor 30 on walls 14 and 16 is preselected to place fins 34 and 36 in thermal proximity to the temperature source within cell 20, namely the active plate region. To secure sensor 30 to wall 14, dimples 31 are provided in fin 34 which engage corresponding openings 15 in wall 14. Wall 16 and fin 36 are secured similarly.

Within trough 32, as best seen in FIG. 2, a plurality of diodes 40 are embedded in a potting compound 50 such as a filled epoxy material which will not impair the thermal path from cells 20 to diodes 40. Diodes 40 are series connected together and communicate with an electrical connector 46 via leads 42 and 44.

Figure 4:
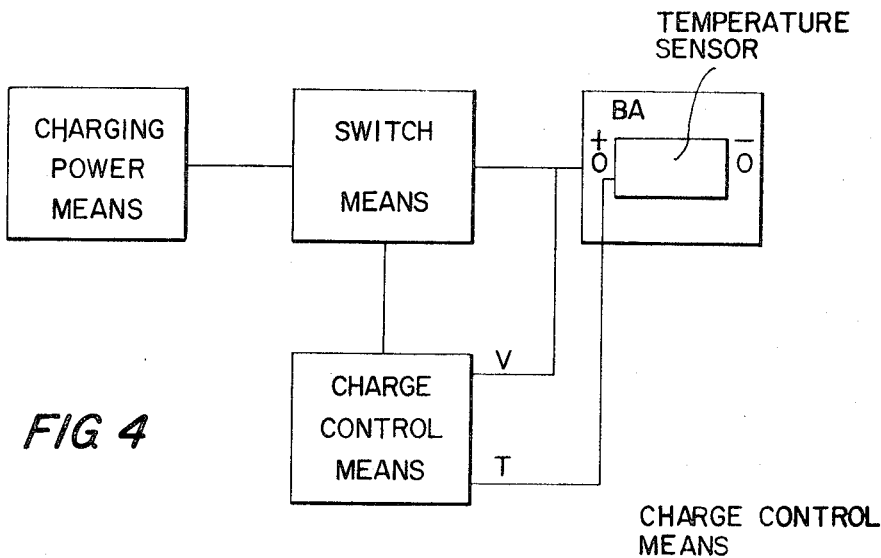
FIG. 4 is a block diagram of a charging circuit useful with the temperature sensing system of the invention.

In FIG. 4 a general charging circuit diagram is shown which can be used with the temperature sensing system of the invention. While the charge control portion of the diagram will be described in more detail below, briefly its function is to monitor the battery voltage through connection V and to monitor the battery temperature via connection T and to act in response to the voltages measured to activate the switching means to modify the high charging rate applied to the battery by the charging power means.

A constant current supplied to diodes 40 results in a voltage indicative of the temperature of the diodes (and thus of the battery surrounding sensor 30). As the temperature rises the voltage across each diode will drop. The total voltage change across the diodes with a change in temperature is thus a summation of the individual voltage change across each diode. It should be noted here that the use of a plurality of diodes in series rather than only one diode is thus principally to magnify the voltage change thus decreasing the sensitivity needed to detect the voltage change.

The magnitude of the voltage drop across each diode per degree of temperature change is a function of the value of the constant current being passed through the diode. Thus, while the diode will exhibit a linearity of voltage change per degree of temperature change (over the desired temperature range corresponding to contemplated operating temperatures of the battery, for example from about −25° C. to about +75° C.) independent of current value, the magnitude of the voltage change per degree of temperature change is dependent on the value of the constant current being passed through the diode.

In accordance with the invention the current value of the constant current passed through the diodes is adjusted to provide a voltage change per degree of temperature change which is a convenient proportion of the voltage change per degree of temperature change at the battery cut-off voltage level. For example, in a nickel-cadmium battery comprising ten 1.2 volt cells, the cut-off voltage at 25° C. signifying that the high charge rate such as, for example, a 1 hour or C rate charging current should be discontinued represents a cut-off voltage of about 14.8 volts. A corresponding voltage, for example, of 7.0 volts across 10 series-connected diodes 40 thus represents about 50 percent of the cut-off voltage. The constant current passing through these ten diodes is then adjusted to match the temperature coefficient of the battery so that when the temperature falls, for example, to 5° C. the resulting voltages, although changed in absolute values, are still maintained in the same proportion, namely the sensor voltage across the diodes represents 50 percent of the proper battery cut-off voltage at 5° C.

Figure 5:
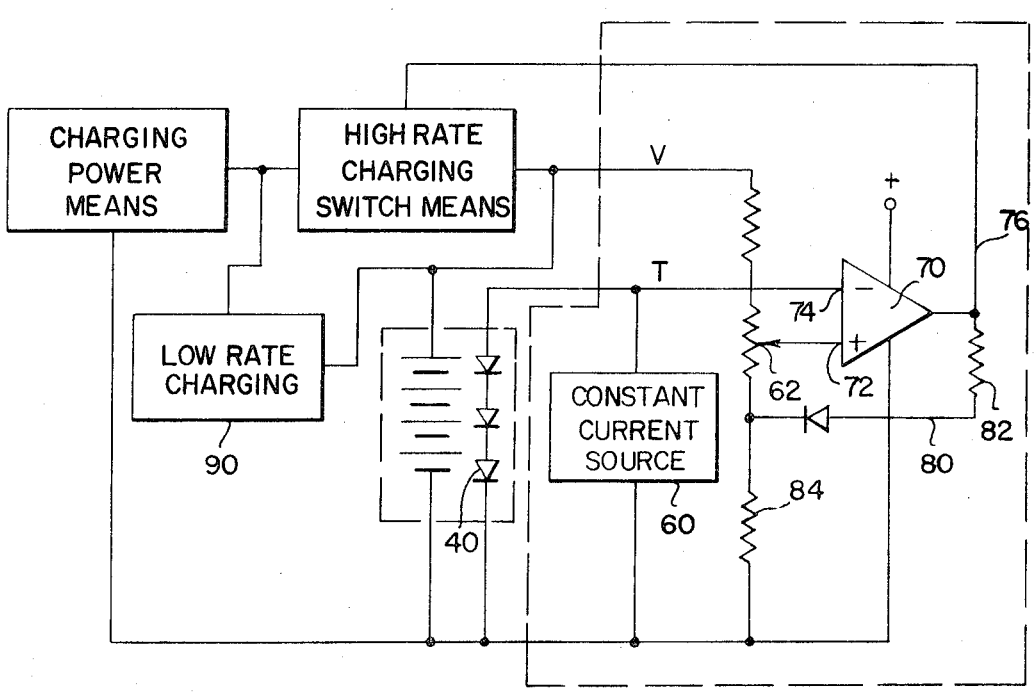
FIG. 5 is a modification of FIG. 4 which also shows a schematic diagram of the temperature sensing system.

Turning now to FIG. 5, an amplified, and slightly modified form of the charging circuit of FIG. 4 is illustrated wherein the charge control means are shown to include a constant current source 60 to pass a constant current through diodes 40. A voltage divider 62 is used to adjust the monitored battery voltage (at the desired cut-off level) to that across the diodes. The two voltages are then fed into a high gain differential amplifier 70 which supplies a signal through line 76 to which means 100 to switch off the high current rate when the voltage at terminal 72 very slightly exceeds the level of voltage at terminal 74 signifying that the battery has reached the desired cut-off voltage. A feed back line 80 feeds a signal back through resistor 82 to the input circuit connected to terminal 72 of amplifier 70 to lock the switch in an off state as will be described below. Switch 100 can be any convenient device such as a normally closed relay or a solid state switch.

FIG. 5 also illustrates the use of a low rate bypass 90 which enables one to continue charging at a low rate after the high rate switch has been turned off. Alternatively the values of resistors 82 and 84 can be selected so that differential amplifier 70 continues to pass a signal through line 76 to maintain the high rate switch in an off position only until the battery voltage level drops to a predetermined value. At this value the voltage at terminal 72 will fall below the voltage at terminal 74 allowing the high rate switch to turn on again by cutting off the signal to the switch through line 76.

It should be noted here that the sensing system of the invention comprising the diode sensor and its constant current source could also be used, with appropriate circuitry, to control a constant potential charger. In such a charging system the constant potential charging voltage to be applied will depend upon the temperature of the battery. The temperature sensing system of the invention could therefore be used to proportionally determine the proper charging voltage level depending upon the temperature of the battery.

Thus my invention provides temperature sensing means producing a voltage proportional to the battery voltage at which charge control action should be accomplished. This proportionality remains a constant over a broad temperature range.

What is claimed is:

1. A battery charging system for a rechargeable battery having temperature compensated voltage sensing means wherein a charger recharges the battery at a high rate of charge to a predetermined charge level indicated by an increase in battery voltage to a predetermined level which varies with the temperature of the battery, said temperature compensated voltage sensing means comprising:

A. Diode means in thermal communication with said battery, having a predetermined linear temperature co-efficient of voltage substantially matching the temperature co-efficient of voltage of said battery which comprises the change in voltage per degree change in temperature at said predetermined charge level during charging over a temperature range of from about −25° to +75°C;

B. Constant current means to pass a constant current through said diode means to provide a temperature-variable voltage over said temperature range which will be in a substantially constant direct proportion to said temperature-variable battery voltage at said predetermined charge level relatively independent of the temperature of the battery;

C. Voltage monitoring means to measure the voltage across said diode means and across said battery; and D. Charge control means including a switch to turn off said high rate of charge in response to a signal voltage from said sensing means when the battery voltage reaches a predetermined proportion of said voltage across said diodes.

2. The system of claim 1 wherein said diode means comprises a plurality of series-connected diodes.

3. The system of claim 2 wherein said battery comprises a casing having at least two parallel rows of cells therein with a central portion between the rows and said sensing means are mounted in said central portion spaced from said casing and in thermal communication with at least two cells in each row.

4. A rechargeable battery comprising a casing having a plurality of cells arranged in two, parallel rows therein; and having temperature sensing means therein comprising a channel shaped member placed between said rows, said member having a central portion and fin portions, one of said fin portions thermally contacting a plurality of cells in one row and another fin portion thermally contacting a plurality of cells in the other row, said central portion having series-connected diodes therein having a predetermined linear temperature coefficient substantially matching the temperature coefficient of voltage of said cells and thereby providing, in response to an impressed constant current, a signal voltage which will remain at a substantially constant proportion to the cut-off voltage of said cells over a temperature range of from about −25°C to about +75°C.

5. The battery of claim 4 wherein said diodes in said central portion are embedded in a potting compound.

6. The battery of claim 5 wherein an external connection is provided on said casing in electrical communication with said sensing means.

* * * * *